United States Patent
Güntherberg et al.

(10) Patent No.: US 6,723,774 B2
(45) Date of Patent: Apr. 20, 2004

(54) METHOD FOR PRODUCING CAOUTCHOUC PARTICLES

(75) Inventors: Norbert Güntherberg, Speyer (DE); Bernhard Czauderna, Hirschberg (DE); Michael Breulmann, Mannheim (DE); Sabine Oepen, Ellerstadt (DE); Wil Duijzings, Born (NL); Norbert Niessner, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 21 days.

(21) Appl. No.: 10/221,080

(22) PCT Filed: Mar. 14, 2001

(86) PCT No.: PCT/EP01/02850

§ 371 (c)(1),
(2), (4) Date: Sep. 10, 2002

(87) PCT Pub. No.: WO01/70835

PCT Pub. Date: Sep. 27, 2001

(65) Prior Publication Data

US 2003/0032741 A1 Feb. 13, 2003

(51) Int. Cl.⁷ .............. C08F 36/00; C08F 2/24; C08F 2/22; C08F 36/06
(52) U.S. Cl. ............ 524/458; 524/814; 524/821; 524/836; 525/242; 525/244; 525/313; 525/902; 526/201; 526/295; 526/335; 526/337; 526/338; 526/339; 526/340; 526/340.1
(58) Field of Search ................ 524/458, 814, 524/821, 836; 525/242, 244, 313, 402; 526/201, 295, 335, 337, 338, 339, 340, 340.1

(56) References Cited

U.S. PATENT DOCUMENTS

| 5,187,221 | A | | 2/1993 | Schueter | |
| 5,189,107 | A | * | 2/1993 | Kasai et al. | 525/244 |
| 5,750,618 | A | * | 5/1998 | Vogt et al. | 524/836 |
| 6,028,135 | A | * | 2/2000 | Keller et al. | 524/458 |
| 6,034,173 | A | | 3/2000 | Rivet | |

FOREIGN PATENT DOCUMENTS

| CA | 2059425 | 7/1992 | |
| EP | 276 894 | 8/1988 | |
| EP | 387 855 | 9/1990 | |
| EP | 728 774 | 8/1996 | |
| EP | 761 693 | 3/1997 | |
| EP | 761693 A2 * | 3/1997 | C08F/2/22 |
| EP | 792 891 | 9/1997 | |

* cited by examiner

Primary Examiner—Kelechi C. Egwim
(74) Attorney, Agent, or Firm—Keil & Weinkauf

(57) ABSTRACT

The invention relates to a method for producing caoutchouc particles (K) by means of emulsion polymerisation in the presence of an emulsifier and a polymerisation initiator. Said particles contain A) 80 to 100 wt. % of one or more conjugated diene monomers (A) in relation to (K) and B) 0 to 20 wt. % of one or more monoethylenically unsaturated comonomers (B) in relation to (K) in the polymerised form. The inventive method is characterised in that 1) a mixture (M1) containing water and an emulsifier is provided, 2) a mixture (M2) containing one or more monomers in the monomer or polymerised form selected from styrole, α-methylstyrole, butadiene, n-butylacrylate, MMA and acrylnitrile and optionally comonomers is added, 3) polymerisation of the obtained mixture starts in the presence of a polymerisation initiator at temperature of 5 to 95° C., 4) a mixture (M3) containing 0 to 100 wt. % of the comonomers (B) in relation to (B) and 0 to 25 wt. % of the diene monomers (A) in relation to (A) is added, 5) a mixture (M4) containing the (remaining) diene monomers (A) and the (remaining) comonomers (B) is proportioned and polymerised and 6) polymerisation is terminated when there is conversion of more than 90 and less than 95% in relation to the sum of the monomers.

12 Claims, No Drawings

METHOD FOR PRODUCING CAOUTCHOUC PARTICLES

The invention relates to a process for preparing rubber particles K comprising in polymerized form A) from 80 to 100% by weight, based on K, of one or more conjugated diene monomers A, and
B) from 0 to 20% by weight, based on K, of one or more monoethylenically unsaturated comonomers B by emulsion polymerization in the presence of an emulsifier and a polymerization initiator. The invention further relates to the rubber particles K prepared by the process and to their use as a constituent of thermoplastic molding compounds, dispersions, paper coating compositions and surface coatings, and for textile finishing.

Processes for the emulsion polymerization of rubbers based on butadiene or other rubber-forming dienes where some or all of the monomers are metered in during the polymerization (known as feed techniques) are known.

For instance, DE-A 34 47 585 describes styrene-butadiene latices whose graft base contains at least 86% by weight styrene and whose graft contains at least 62% by weight styrene, which are prepared by a feed technique with or without a polystyrene seed latex. This document does not disclose butadiene-rich latices.

EP-A 387 855 discloses a feed technique for preparing polymer particles comprising, inter alia, styrene and butadiene where a seed latex having a weight-average molecular mass $\overline{M}_w$ of only from 500 to 10,000 is used. Although the comparative examples do include seed latices of relatively high molecular mass, the butadiene fraction in the feed stream is not more than 40% by weight, i.e., these polymer particles are also low in butadiene.

EP-A 814 103 discloses a feed technique for preparing polymer dispersions comprising, inter alia, styrene and butadiene where a seed latex is mixed with the monomers and emulsified and this emulsion is then metered into the heated polymerization reactor. The seed latex, accordingly, is not included in the initial charge but instead is present in the feed stream, leading to an undesirably wide particle size distribution.

EP-A 276 894 discloses adhesive compositions comprising starch and styrene-butadiene latices. The latices are prepared by a feed technique using a polystyrene seed latex and contain more than 60% by weight styrene, and are therefore low in butadiene.

EP-A 792 891 discloses a process for preparing latices based on conjugated dienes such as butadiene, where a seed latex, comprising, in particular, polystyrene particles of from 10 to 80 nm in diameter, is included in the initial charge. In the presence of an activator (i.e. initiator) and an emulsifier, the entirety of the monomers are metered in such that a defined relationship between polymerization rate and monomer addition rate is established. The polymerization is only ended when the conversion is at least 95%. Accordingly, only the seed latex is included in the initial charge, and not a portion of the monomers. In comparative experiments, all monomers are introduced in the initial charge together with the seed latex (batch, i.e., no feed stream).

EP-A 761 693 discloses a process for preparing diene latices where a certain fraction of the reaction mixture is included in the initial charge, so that a defined vessel filling level is achieved, and the remainder of the reaction mixture is run in under controlled conditions. Using this process it is possible to produce only small particles of from 60 to 120 nm in diameter. The increased utilization of the gas space in the vessel for cooling purposes, which is intrinsic to the process, leads to increased formation of coagulum. Moreover, the polymerization time is uneconomically long.

The latices and polymer particles of the prior art have the following disadvantages: they are low in butadiene, or long polymerization times are needed in order to prepare relatively large particles. Moreover, the prior art processes have large amounts of unreacted monomers during the polymerization reaction (known as hold-up), which may be a safety risk in the case of disruptions (poor operational safety).

It is an object of the present invention to provide a process which does not have the disadvantages depicted. In particular, the intention was to provide a process which enables diene-rich rubber particles having diene contents ≧80% by weight and particle sizes above 100 nm to be prepared in a short time. Furthermore, the process is to be operationally safe by virtue of the fact that the proportion of unreacted monomers (hold-up) in the reactor is kept low.

We have found that this object is achieved by the process defined at the outset. This process comprises 1) initially introducing a mixture M1 comprising, based on M1,
   M1a) from 20 to 100% by weight of the water needed to prepare the emulsion (emulsion water), and
   M1b) from 0.1 to 100% by weight of the emulsifier,
2) simultaneously or subsequently adding a mixture M2 comprising, based on M2,
   M2a) from 90 to 100% by weight of one or more monomers selected from styrene, α-methylstyrene, butadiene, n-butyl acrylate, methyl methacrylate and acrylonitrile, and
   M2b) from 0 to 10% by weight of one or more copolymerizable monomers,
   the monomers M2a) and M2b) being added alternatively in polymerized form as a seed latex, or in monomeric form with subsequent in situ polymerization to give a seed latex, or as a mixture of polymerized and monomeric form, and the seed latex polymer having a weight-average molecular mass of more than 20,000,
3) then starting the polymerization of the resulting mixture in the presence of the polymerization initiator at temperatures of from 5 to 95° C.,
4) simultaneously or subsequently adding a mixture M3 comprising
   M3a) from 0 to 100% by weight, based on B, of the comonomers B, and
   M3b) from 0 to 25% by weight, based on A, of the diene monomers A,
5) simultaneously or subsequently metering in a mixture M4 comprising
   M4a) the remaining 75 to 100% by weight, based on A, of the diene monomers A, and
   M4b) the remaining 0 to 100% by weight, based on B, of the comonomers B,
   and carrying out polymerization, and
6) subsequently ending the polymerization at a conversion above 90 and below 95%, based on the sum of the monomers, the remaining 0 to 80% by weight of the emulsion water and the remaining 0 to 99.9% by weight of the emulsifier being added individually or separately from one another in one or more of steps 2) to 5).

We have additionally found the rubber particles K prepared by the process and their uses as specified at the outset.

The rubber particles K prepared by the process of the invention comprise in polymerized form A) from 80 to 100, preferably from 85 to 100% by weight, based on K, of one or more conjugated diene monomers A, and B) from 0 to 20, preferably from 0 to 15% by weight, based on K, of one or more monoethylenically unsaturated comonomers B which are copolymerizable with the diene monomers A to give copolymers.

Suitable diene monomers A are all dienes having conjugated double bonds, especially butadiene, isoprene, chloroprene or mixtures thereof. Particular preference is given to butadiene or isoprene or mixtures thereof. With very particular preference, butadiene is used.

Suitable comonomers B are all monoethylenically unsaturated monomers, especially vinylaromatic monomers such as styrene, styrene derivatives of the formula I

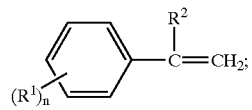

(I)

where $R^1$ and $R^2$ are hydrogen or $C_1$–$C_8$-alkyl and n is 0, 1, 2 or 3;

methacrylonitrile, acrylonitrile;

acrylic acid, methacrylic acid, and also dicarboxylic acids such as maleic acid and fumaric acid and also their anhydrides such as maleic anhydride;

nitrogen-functional monomers such as dimethylaminoethyl acrylate, diethylaminoethyl acrylate, vinylimidazole, vinylpyrrolidone, vinylcaprolactam, vinylcarbazole, vinylaniline, acrylamide;

$C_1$–$C_{10}$ alkyl esters of acrylic acid, such as methyl acrylate, ethyl acrylate, n-propyl acrylate, i-propyl acrylate, n-butyl acrylate, isobutyl acrylate, sec-butyl acrylate, tert-butyl acrylate, ethylhexyl acrylate, and the corresponding $C_1$–$C_{10}$ alkyl esters of methacrylic acid, and also hydroxyethyl acrylate;

aromatic and araliphatic esters of acrylic acid and methacrylic acid such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

N-substituted maleimides such as N-methyl-, N-phenyl- and N-cyclohexylmaleimide;

unsaturated ethers such as vinyl methyl ether;

crosslinking monomers, as described later on below in connection with the comonomers M2b);

and mixtures of these monomers.

Preference is given to styrene, α-methylstyrene, p-methylstyrene, t-butylstyrene, n-butyl acrylate, methyl methacrylate (MMA), acrylonitrile or mixtures thereof as comonomers B. Particular preference is given to styrene, n-butyl acrylate, methyl methacrylate, acrylonitrile or mixtures thereof. In particular, styrene is used.

In one particular embodiment the rubber particles K are prepared using, based on K, A) from 70 to 99.9, preferably from 90 to 99% by weight of butadiene, and B) from 0.1 to 30, preferably from 1 to 10% by weight of styrene, acrylonitrile, MMA, n-butyl acrylate or mixtures thereof.

The rubber particles K are prepared by the technique of emulsion polymerization. Customary emulsifiers are used, examples being alkali metal salts of alkyl- or alkylarylsulfonic acids, alkyl sulfates, fatty alcohol sulfonates, salts of higher fatty acids with 10 to 30 carbon atoms, sulfosuccinates, ether sulfonates or resin soaps. It is preferred to employ the alkali metal salts, especially the Na and K salts, of alkylsulfonates or fatty acids with 10 to 18 carbon atoms. Preferred emulsifiers used are the abovementioned salts of higher fatty acids. Potassium and sodium stearate are particularly preferred. It is also possible to use mixtures of different emulsifiers.

In general, the emulsifiers are used in amounts of from 0.1 to 5% by weight, in particular from 0.2 to 3% by weight, based on the monomers A and B used. Amounts of from 0.2 to 1% by weight are particularly preferred.

The following comments apply to the polymerization initiators: for starting the polymerization reaction, suitable free-radical initiators are all those which decompose at the chosen reaction temperature, i.e., both those which decompose by heat alone and those which do so in the presence of a redox system. Suitable polymerization initiators are preferably free-radical initiators, examples being peroxides such as preferably peroxosulfates (for instance sodium or, with particular preference, potassium persulfate) and azo compounds such as azodiisobutyronitrile. It is also possible, however, to use redox systems, especially those based on hydroperoxides such as cumene hydroperoxide. Mixtures of different initiators may also be used.

In general, the polymerization initiators are used in an amount of from 0.1 to 1% by weight, based on the monomers A and B.

The dispersion is preferably prepared using sufficient water for the finished dispersion to have a solids content of from 30 to 60, preferably from 40 to 55% by weight. It is common to operate at a water/monomer ratio of from 2:1 to 0.7:1.

The process of the invention comprises six steps.

In step 1), a mixture M1 is introduced. It comprises, based on M1,

M1a) from 20 to 100, preferably from 50 to 100% by weight of the water needed to prepare the emulsion (emulsion water), and M1b) from 0.1 to 100, preferably from 15 to 100% by weight of the emulsifier.

The mixture M1, accordingly, may contain the entirety or only part of the water needed to prepare the emulsion (referred to hereinbelow as emulsion water). The same applies, mutatis mutandis, to the emulsifier.

In step 2), simultaneously with step 1) or subsequently, a mixture M2 is added. It contains, based on M2, M2a) from 90 to 100, preferably from 95 to 100% by weight of one or more monomers selected from styrene, α-methylstyrene, butadiene, n-butyl acrylate, MMA and acrylonitrile, and M2b) from 0 to 10, preferably from 0 to 5% by weight of one or more copolymerizable monomers.

Suitable comonomers M2b) are all monomers already stated for the comonomers B, plus crosslinking monomers.

Crosslinking monomers are bifunctional or polyfunctional comonomers having at least two olefinic nonconjugated double bonds, examples being divinyl esters of dicarboxylic acids such as of succinic acid and adipic acid, diallyl and divinyl ethers of bifunctional alcohols such as of ethylene glycol and of 1,4-butanediol, diesters of acrylic acid and methacrylic acid with said bifunctional alcohols, 1,4-divinylbenzene, and triallyl cyanurate. Particular preference is given to the acrylic ester of tricyclodecenyl alcohol, which is known under the name dihydrodicyclopentadienyl acrylate, and to the allyl esters of acrylic and methacrylic acid.

If crosslinking monomers are used as comonomers M2b), their proportion is preferably from 0.01 to 5, in particular from 0.05 to 3% by weight, based on M2.

The monomers M2a) and M2b) may be added either in polymerized form, i.e., as a seed latex comprising polymer particles plus water M2c), or in monomeric form. If they are added in monomeric form, they are polymerized in situ in step 3) (starting of the polymerization) to give a seed latex, i.e., in this case the seed latex is formed in situ before or during the polymerization reaction of the diene monomers A and the comonomers B, or, before or during the polymerization reaction of step 3), particles are formed which serve as growth nuclei for the emulsion polymerization.

The monomers M2a) and M2b) may also be added as a mixture of polymerized and monomeric form, i.e., a portion of M2a) and M2b) has already been incorporated in the polymerized seed latex and the remaining portion is polymerized in situ as described.

The polymers of step 2) are composed preferably of from 95 to 100% by weight of styrene or n-butyl acrylate and from 0 to 5% by weight of the aforementioned crosslinking monomers (i.e., a seed latex comprising crosslinked or uncrosslinked polystyrene or crosslinked or uncrosslinked poly-n-butyl acrylate). Polystyrene polymer particles are particularly preferred.

In accordance with the invention, the seed latex particles have a weight-average molecular mass $\overline{M}_w$ of more than 20,000, as determined by GPC measurement. The seed latex, accordingly, contains no low molecular mass polymers (weight average), but only polymer particles of customary molecular weight.

Preferably, the seed latex particles have a weight-average particle size $d_{50}$ of from 10 to 100, with particular preference from 10 to 80, in particular from 20 to 70 nm.

Thereafter, in step 3) of the process of the invention, the polymerization of the mixture obtained in steps 1) and 2) is started in the presence of the polymerization initiator at temperatures of from 5 to 95° C., preferably from 40 to 95° C.

The remaining 0 to 80% by weight of the emulsion water and the remaining 0 to 99.9% by weight of the emulsifier are added individually or separately from one another in one or more of the steps 2) to 5).

The polymerization initiators—already described above—are added to the reaction mixture, for example, discontinuously in the form of the total amount at the beginning of the reaction, or, divided into two or more portions, at the beginning and at one or more subsequent points in time, or continuously throughout a certain time interval. The continuous addition may also be made along a gradient which may, for example, be ascending or descending, linear or exponential, or else stepwise (step function).

In particular, the initiators may be added as early as in step 1) of the process or not until during step 2) or 3) or 4) or 5). Similarly, a portion of the initiators may be added in step 1) and a further portion in step 2) and/or step 3) and/or 4) and/or 5). Preferably, one portion of the initiator is added in step 2) and the remaining portion metered in in step 3) of the process.

In one preferred embodiment, the initiator is added in step 1) and/or 3) and further initiator is added in step 4) and/or 5) in the form of a metering program (defined metering).

In another preferred embodiment, initiator is added in step 3) and further initiator is metered in subsequently during steps 4) and 5) in stages or continuously or in intervals.

The same applies, mutatis mutandis, to the mode of addition of the emulsifiers. Preferably, one portion of the emulsifiers is included in the initial charge and one portion is run in with the remaining emulsion water.

Moreover, it is possible to use molecular weight regulators such as, for example, ethylhexyl thioglycolate, n- or t-dodecyl mercaptan or other mercaptans, terpinols, and dimeric α-methylstyrene or other compounds suitable for regulating the molecular weight. The molecular weight regulators are added discontinuously or continuously to the reaction mixture, as described above for the initiators and emulsifiers.

To maintain a constant pH of preferably from 7 to 11, more preferably from 8 to 10, it is possible to use buffer substances such as $Na_2HPO_4/NaH_2PO_4$, sodium hydrogen carbonate/sodium carbonate, or buffers based on citric acid/citrate. Other buffer systems are also suitable, provided they keep the pH within the stated range. Regulators and buffer substances are used in the customary amounts, rendering further details of this superfluous.

In step 4), simultaneously with step 3) or subsequently, a mixture M3 is added. It contains M3a) from 0 to 100, preferably from 50 to 100 and with particular preference from 95 to 100% by weight, based on B, of the comonomers B, and M3b) from 0 to 25, preferably from 0 to 20% by weight, based on A, of the diene monomers A.

Preferably, the entirety of the comonomers B is metered in in step 4).

In step 5), simultaneously with step 4) or subsequently, mixture M4 is metered in, containing M4a) the remaining 75 to 100, preferably from 80 to 100% by weight, based on A, of the diene monomers A, and M4b) the remaining 0 to 100, preferably from 0 to 50 and with particular preference from 0 to 5% by weight, based on B, of the comonomers B, and the monomers are polymerized.

As already mentioned, initiators and emulsifiers may also be metered in in step 5). This is preferred. The monomers A and, if appropriate, B, the initiators and emulsifiers may be metered in together as a mixture (a feed stream) or—preferably—separately from one another as two or more feed streams. Molecular weight regulators as well are metered in preferably as a feed stream, either alone or in a mixture with the metered monomers and/or emulsifiers. In one preferred embodiment, one feed stream comprises the monomers, another feed stream comprises the initiators, and a further feed stream comprises the emulsifiers.

In another preferred embodiment, the monomers A and, if appropriate, B, the emulsifiers and, if appropriate, the regulators are emulsified together with a portion of the emulsion water and are metered in in the form of this emulsion. This emulsion may be prepared, for example, in a separate vessel, or else may be prepared continuously by means of active or passive emulsifying systems, examples being inline mixers, Sulzer mixers, or dispersers operating in accordance with a rotor-stator principle (e.g., Dispax®, IKA).

In another, particularly preferred embodiment, one feed stream comprises a mixture of monomers, water, molecular weight regulator and emulsifiers and a further feed stream comprises the initiators. In a particularly preferred embodiment more than 50% by weight in each case of the total amount of the initiators, of the total amount of the emulsifiers, and of the total amount of the molecular weight regulators are not included in the initial charge in step 1) but instead are metered in in step 5).

The metered addition may take place at a constant rate or along a gradient, which may, for example, be ascending or descending, linear, exponential, or stepwise (step function). This applies, for example, to monomers, emulsifiers, initiators and/or regulators.

In particular, in the case of more than one feed stream, the respective metered additions may differ in their duration. For example, the feed stream of monomers and/or emulsifiers may be metered in over a shorter time than the feed stream of the initiators. This is preferred.

Preferably, the duration of the metered addition of the monomers A and, if appropriate, B in step 5) is from 1 to 18, with particular preference from 2 to 16 and in particular from 4 to 14 hours.

In one preferred embodiment, the rate of metered addition of the monomers A and B in step 5) is chosen so that at no point in time during the polymerization reaction of A and B are more than 50% by weight of the entirety of monomeric A+B present in the polymerization reactor.

In one particularly preferred embodiment, the rate of metered addition of the monomers A and B in step 5) is chosen so that up to a conversion of 50%, based on the sum of A+B, less than 30%, based on the sum of unpolymerized and polymerized monomers A+B, of unpolymerized monomers are present in the polymerization reactor.

In a preferred embodiment of the process, the polymerization conditions, especially the nature, the amount and the metering (mode of addition) of the emulsifier, are chosen in a manner known per se such that the weight-average particle size $d_{50}$ of the rubber particles K is from 80 to 800, preferably from 100 to 400, with particular preference from 110 to 350 and in particular from 120 to 300 nm.

In the subsequent step 6) of the process, the polymerization is ended at a conversion of more than 90 and less than 95%, based on the sum of the monomers. In other words, the polymerization is ended when the following condition applies to the conversion U: 90%<U<95%.

The polymerization is ended in a customary manner, for example, by lowering the reactor temperature or by adding inhibiting substances, such as diethylhydroxylamine, for example, or by removing the unreacted monomers, for instance, by letting down the reactor, or by a combination of these termination methods.

It is preferred to establish a temperature gradient during the individual steps of the process, e.g., step 4): starting at from 60 to 80° C., step 5): during the polymerization, a gradient up to a maximum temperature of from 75 to 95° C., step 6): ending by cooling to 50° C. and/or removing the monomers.

Heating and cooling may be carried out, for example, linearly or stepwise, in accordance with another function. In particular, the heating may follow the adiabatic course of the reaction, utilizing the heat of reaction.

Normally, the polymerization of the rubber particles K is conducted under reaction conditions chosen so as to give rubber particles having a defined state of crosslinking. Examples of parameters which are essential to this are the reaction temperature and reaction time, the ratio of monomers, regulator, initiator and the feed rate, and the amount of and timing of the addition of regulator and initiator, and also the nature and amount of any crosslinking monomers used.

One method of characterizing the state of crosslinking of crosslinked polymer particles is the measurement of the swelling index SI, which is a measure of the swellability of a more or less strongly crosslinked polymer by a solvent. Examples of customary swelling agents are methyl ethyl ketone and toluene. The SI of the rubber particles of the invention is usually in the range from 10 to 60, preferably from 15 to 55 and with particular preference from 18 to 50.

Another method of characterizing the state of crosslinking is the measurement of NMR relaxation times of mobile protons, known as the $T_2$ times. The higher the degree of crosslinking of a particular network, the lower its $T_2$ times. Customary $T_2$ times for the rubber particles of the invention are in the range from 2.0 to 4.5 ms, preferably from 2.5 to 4.0 ms and with particular preference from 2.5 to 3.8 ms, measured on filmed samples at 80° C.

A further measure to characterize the rubber particles and their state of crosslinking is the gel content, i.e., that product fraction which is crosslinked and is therefore insoluble in a certain solvent. It is sensible to determine the gel content in the same solvent as the swelling index. For the rubber particles of the invention, customary gel contents are in the range from 45 to 90%, preferably from 50 to 85% and with particular preference from 55 to 80%.

The swelling index is determined, for example, by the following method: approximately 0.2 g of the solid of a rubber particle dispersion filmed by evaporating the water is swollen in a sufficient quantity (e.g., 50 g) of toluene. After, say, 24 h, the toluene is filtered off with suction and the sample is weighed. The sample is then dried under reduced pressure and weighed again. The swelling index is the ratio of the weight after the swelling process to the dry weight after the second drying operation. Accordingly, the gel content is calculated from the ratio of the dry weight after the swelling step to the initial weight before the swelling step (×100%).

The $T_2$ time is determined by measuring the NMR relaxation of a rubber particle dispersion sample from which the water has been removed to leave a film. For this purpose, for example, the sample is dried in air overnight and at 60° C. for 3 h under reduced pressure and then measured with an appropriate measuring instrument, an example being the minispec instrument from Bruker, at 80° C. It is only possible to-compare samples measured by the same method, since the relaxation is highly temperature-dependent.

The rubber particles K may be used as they are or else further monomers may be polymerized on, especially by grafting.

These monomers which are polymerized on generally form a shell which encloses the rubber particles K. In the case of a graft polymerization, it is referred to as the graft shell or graft, and graft polymers are formed.

The shell may be composed of all monomers which may be free-radically polymerized in emulsion.

The preparation of the shell may take place under the same conditions as for the preparation of the rubber particles K, it being possible to prepare the shell in one or more process steps (single-stage or multistage grafting). It is also possible to polymerize on more than two shells, by changing the monomers appropriately. The transitions between the shells (stages) may be sharply defined or tapered. Further details on the preparation of the graft polymers are described in DE-A 12 60 135 and 31 49 358.

After the end of the polymerization—whether with or without a shell polymerized on—the rubber particles K are present as a dispersion in water. This dispersion may either be processed further as it is or else the rubber particles K may be separated from the aqueous phase. This operation takes place in a manner known per se, for example, by sieving, filtering, decanting or centrifuging, it being possible to dry the rubber particles further, if required, in a customary manner, for instance, by means of hot air, spray drying, or using a pneumatic dryer.

The rubber particles K prepared by the process of the invention may be put to diverse uses. Merely by way of example, mention may be made of their use in unprocessed form as a dispersion for paints (emulsion paints) or in papermaking (paper coating compositions) and also as surface coatings and for textile finishing. Similarly, they may be used as a graft base for impact modification of thermoplastic molding compounds.

The production of thermoplastic molding compounds comprising the rubber particles K may take place by conventional methods, for example, by incorporating the still moist or dried rubber particles K into the thermoplastic matrix at above the melting point of the matrix, in particular at temperatures of from 150 to 350° C., in customary mixing apparatus, such as extruders or compounders. It is also possible to incorporate the dispersion of the rubber particles K as it is directly into the thermoplastics, with the dispersion water being removed in the course of incorporation in a customary manner, for instance, as steam by way of devolatilization equipment.

The stated average particle size d comprises the weight average of the particle size, as determined using an analytical ultracentrifuge in accordance with the method of W. Scholtan and H. Lange, Colloid-Z. und Z.- Polymere 250 (1972) 782 to 796. The ultracentrifuge measurement provides the integral mass distribution of the particle diameter of a sample. From this it is possible to derive the percentage by weight of the particles having a diameter equal to or smaller than a certain size.

The $d_{10}$ value indicates that particle diameter at which 10% by weight of all particles have a smaller diameter and 90% by weight have a larger diameter. Conversely, the $d_{90}$ value is that at which 90% by weight of all particles have a smaller diameter and 10% by weight have a larger diameter than the diameter corresponding to the $d_{90}$ value. The weight-average particle diameter $d_{50}$ indicates that particle diameter at which 50% by weight of all particles have a larger diameter and 50% by weight have a smaller particle diameter. The $d_{10}$, $d_{50}$ and $d_{90}$ values characterize the breadth Q of the particle size distribution, such that $Q=(d_{90}-d_{10})/d_{50}$. The smaller Q is, the narrower the distribution.

EXAMPLES

The fraction of monomers present in the reactor which have not yet reacted at a certain conversion is referred to hereinbelow as the holdup. It is based on the total amount of monomers added to the reactor up until the time in question.

Deionized water was used.

The polystyrene seed latex used had an average molecular mass of the polystyrene particles of more than 100,000 as measured by GPC.

Example 1

In a steel autoclave (120 l) containing 50 kg of water, 0.189 kg of potassium stearate, 150 g of sodium hydrogen carbonate ($NaHCO_3$) and 83 g of potassium persulfate (KPS) were dissolved at 63° C. The temperature was then increased to 67° C. Over the course of 35 minutes a mixture of 8.658 kg of butadiene and 3.367 kg of styrene was metered into the initial charge. 10 minutes after the start of the metered addition, 160 g of tert-dodecyl mercaptan (TDM) were metered into the vessel.

During the subsequent phases of the polymerization, the temperature was increased in steps to the final temperature. 36.8 kg of butadiene were metered into the reactor over the course of 10 h (feed stream 2), beginning 2 hours after the start of the first metered addition. 6 h after the start of feed stream 2, a further 160 g of TDM were introduced into the reactor. One hour after the end of feed stream 2, a further 160 g of TDM were added. After a further 2 h, the reaction mixture was heated to the final temperature of 75° C. After a further 4 h, the reaction was terminated by cooling to 50° C. and letting down the autoclave.

The conversion was 93.8% at a solids content of 46.9% after a total time of 20 h; the particle size $d_{50}$ was 143 nm and the SI was 33. The holdup at 50% conversion was approximately 25%.

Example 2

In a steel autoclave (120 l) containing 48.5 kg of water, 0.189 kg of potassium stearate, 150 g of $NaHCO_3$ and 14 g of KPS were dissolved at 63° C. The temperature was then increased to 70° C. Over the course of 35 minutes a mixture of 8.658 kg of butadiene and 3.367 kg of styrene was metered into the initial charge. 10 minutes after the start of the metered addition, 160 g of TDM were metered into the vessel.

The temperature was raised to 75° C. and 36.03 kg of butadiene were metered into the reactor over the course of 9 h (feed stream 2), beginning 2 hours after the start of the first metered addition. 6 h after the start of feed stream 2, a further 160 g of TDM were introduced into the reactor. Directly after the end of feed stream 2, a further 160 g of TDM were added. After a further 4 h, the reaction was terminated by cooling to 50° C. and letting down the autoclave.

The conversion was 91.4% at a solids content of 44.8% after a total time of 16 h; the particle size $d_{50}$ was 153 nm and the SI was 29. The holdup at 50% conversion was approximately 20%.

Example 3

In a steel autoclave (120 l) containing 46.3 kg of water, 0.150 kg of potassium stearate, 150 g of $NaHCO_3$ and 14 g of KPS were dissolved at 70° C. Then 291 g of a polystyrene seed latex having a particle size of 29 nm and a solids content of 33% were added. Over the course of 2.5 h, a mixture of 8.637 kg of butadiene and 3.359 kg of styrene and 120 g of TDM were metered into the initial charge. After the end of the feed stream, the temperature was raised to 75° C.

30 minutes after the end of the first feed stream, 35.987 kg of butadiene and 360 g of TDM were metered into the reactor over the course of 9.5 h (feed stream 2). A mixture of 130 g of KPS and 4500 g of water were metered into the reactor over the course of 8 h, beginning 1 hour after the start of feed stream 2. 3 h after the end of feed stream 2, the reaction was terminated by cooling to 50° C. and letting down the autoclave.

The conversion was 93% for a solids content of 45.6% after a total time of 16 h; the particle size $d_{50}$ was 134 and the SI was 23. The holdup at 50% conversion was approximately 10%.

Example 4

In a steel autoclave (120 l) containing 30.61 kg of water, 0.050 kg of potassium stearate, 257 g of $NaHCO_3$ and 14 g of KPS were dissolved at 70° C. Then 218 g of a polystyrene seed latex having a particle size of 29 nm and a solids content of 33% were added. Over the course of 35 minutes, 3.353 kg of styrene were metered into the initial charge.

During the subsequent phases of the polymerization, the temperature was increased in steps to the final temperature. An emulsion comprising 100 g of potassium stearate, 15.745 kg of water, 44.546 kg of butadiene and 479 g of TDM was metered into the reactor over the course of 9.5 h (feed stream 2), beginning 25 minutes after the end of the first metered addition. A mixture of 130 g of KPS and 4500 g of water was metered into the reactor over the course of 10.5 h, commencing simultaneously with feed stream 2. 7.5 h after the start of feed stream 2, the reaction mixture was heated to the final temperature of 80° C. 6 h after the end of feed stream 2, the reaction was terminated by cooling to 50° C. and letting down the autoclave.

The conversion was 94.4% at a solids content of 46.5% after a total time of 17 h; the particle size ($d_{50}$) was 175 nm and the SI was 30. The holdup at 50% conversion was approximately 10%.

Example 5

In a steel autoclave (120 l) containing 30.6 kg of water, 0.050 kg of potassium stearate, 254 g of $NaHCO_3$ and 14 g of KPS were dissolved at 70° C. Then 218 g of a polystyrene seed latex having a particle size of 29 nm and a solids content of 33% were added. Over the course of 2.5 h, a mixture of 8.62 kg of butadiene, 3.35 kg of styrene and 120 g of TDM was metered into the initial charge. A mixture of 4500 g of water and 129 g of KPS was run in over the course of 12.5 h, commencing 1 h after the start of the first metered addition.

After the end of the addition of the above monomers, during the subsequent phases of the polymerization, the temperature was raised in steps to the final temperature. 30 minutes after the end of the first feed stream, an emulsion comprising 35.924 kg of butadiene, 100 g of potassium stearate, 15.745 kg of water and 360 g of TDM were metered into the reactor over the course of 9.5 h (feed stream 2). In the course of feed stream 2, the internal reactor temperature was increased in steps until reaching a final temperature of 80° C. 7.5 h after the start of feed stream 2. 6 h after the end of feed stream 2, the reaction was terminated by cooling to 50° C. and letting down the autoclave.

The conversion was 92% for a solids content of 45.2% after a total time of 19 h; the particle size $d_{50}$ was 204 nm and the SI was 46. The holdup at 50% conversion was approximately 20%.

Example 6

In a steel autoclave (120 l) containing 30.6 kg of water, 0.015 kg of potassium stearate, 257 g of $NaHCO_3$ and 29 g of KPS were dissolved at 70° C. Then 218 g of a polystyrene seed latex having a particle size of 29 nm and a solids content of 33% were added. 3.35 kg of styrene were metered into the initial charge over the course of 35 minutes.

25 minutes after the end of the first feed stream, an emulsion comprising 44.52 kg of butadiene, 15.745 kg of water, 135 g of potassium stearate and 479 g of TDM was metered into the reactor over the course of 9.5 h (feed stream 2). In the course of feed stream 2, the temperature was raised in steps until, directly after the end of feed stream 2, a final temperature of 80° C. was reached. Beginning at the same time, a mixture of 144 g of KPS and 4500 g of water was metered into the reactor over the course of 15 h. 12 h after the end of feed stream 2, the reaction was terminated by cooling to 50° C. and letting down the autoclave.

The conversion was 91% for a solids content of 44.6% after a total time of 22.5 h; the particle size $d_{50}$ was 251 nm and the SI was 43. The holdup at 50% conversion was approximately 29%.

We claim:

1. A process for preparing rubber particles K comprising in polymerized form
   A) from 80 to 100% by weight, based on K, of butadiene or isoprene or mixtures thereof (diene monomers A), and
   B) from 0 to 20% by weight, based on K, of one or more monoethylenically unsaturated comonomers B
   by emulsion polymerization in the presence of an emulsifier or a mixture of different emulsifiers selected from the group consisting of alkali metal salts of alkyl- or alkylarylsulfonic acids, alkyl sulfates, fatty alcohol sulfonates, salts of higher fatty acids with 10 to 30 carbon atoms, sulfosuccinates, ether sulfonates and resin soaps, and a polymerization initiator, which comprises
   1) initially introducing a mixture M1 comprising, based on M1,
      M1a) from 20 to 100% by weight of the water needed to prepare the emulsion (emulsion water), and
      M1b) from 0.1 to 100% by weight of the emulsifier,
   2) subsequently adding a mixture M2 comprising, based on M2,
      M2a) from 90 to 100% by weight of one or more monomers selected from styrene, α-methylstyrene, butadiene, n-butyl acrylate, methyl methacrylate and acrylonitrile, and
      M2b) from 0 to 10% by weight of one or more copolymerizable monomers,
      the monomers M2a) and M2b) being added alternatively in monomeric form with subsequent in situ polymerization to give a seed latex, or as a mixture of polymerized and monomeric form, and the seed latex polymer having a weight-average molecular mass of more than 20,000,
   3) then starting the polymerization of the resulting mixture in the presence of the polymerization initiator at temperatures of from 5 to 95° C.,
   4) simultaneously or subsequently adding a mixture M3 comprising
      M3a) from 0 to 100% by weight, based on B, of the comonomers B, and
      M3b) from 0 to 25% by weight, based on A, of the diene monomers A,
   5) simultaneously or subsequently metering in a mixture M4 comprising
      M4a) the remaining 75 to 100% by weight, based on A, of the diene monomers A, and
      M4b) the remaining 0 to 100% by weight, based on B, of the comonomers B,
      and carrying out polymerization, and
   6) subsequently ending the polymerization at a conversion above 90 and below 95%, based on the sum of the monomers, the remaining 0 to 80% by weight of the emulsion water and the remaining 0 to 99.9% by weight of the emulsifier being added individually or separately from one another in one or more of steps 2) to 5).

2. A process as claimed in claim 1, wherein said emulsifiers comprise salts of higher fatty acids with 10 to 30 carbon atoms.

3. A process as claimed in claim 1, wherein said comonomers B comprise styrene, α-methylstyrene, p-methylstyrene, t-butylstyrene, acrylonitrile, methyl methacrylate, n-butyl acrylate or mixtures thereof.

4. A process as claimed in claim 1, wherein the nature, amount and metering of the emulsifier are chosen such that the weight-average particle size $d_{50}$ is from 100 to 400 nm.

5. A process as claimed in claim 1, wherein the entirety of the comonomers B is added in step 4).

6. A process as claimed in claim 1, wherein the entirety of the diene monomers A is added in step 5).

7. A process as claimed in claim 1, wherein the seed latex is composed of styrene as monomer M2a).

8. A process as claimed in claim 1, wherein the weight-average particle size $d_{50}$ of the seed latex particles is from 10 to 100 nm.

9. A process as claimed in claim 1, wherein the metering rate of the monomers A and B in step 5) is chosen so that at no time during the polymerization reaction of A and B is more than 50% by weight of the total amount of monomeric A+B present in the polymerization reactor.

10. A process as claimed in claim 1, wherein the metering rate of the monomers A and B in step 5) is chosen so that up to a conversion of 50%, based on the sum of A+B, less than 30%, based on the sum of unpolymerized and polymerized monomers A+B, of unpolymerized monomers are present in the polymerization reactor.

11. Rubber particles K prepared by a process as claimed in claim 1.

12. The method of using rubber particles K prepared as claimed in claim 1 as a constituent of thermoplastic molding compounds, dispersions, paper coating compositions or surface coatings or for textile finishing.

* * * * *

UNITED STATES PATENT AND TRADEMARK OFFICE
CERTIFICATE OF CORRECTION

PATENT NO. : 6,723,774 B2
DATED : April 20, 2004
INVENTOR(S) : Guentherberg et al.

It is certified that error appears in the above-identified patent and that said Letters Patent is hereby corrected as shown below:

Title page,
Item [54], Title, "METHOD FOR PRODUCING CAOUTCHOUC PARTICLES" should be -- PREPARATION OF RUBBER PARTICLES --

Column 12,
Line 34, "emulsifier, subsequently" should be -- emulsifier needed to prepare the emulsion, subsequently --

Column 13,
Line 14, "weight-average particle" should be -- weight-average rubber particle --

Column 14,
Line 16, "claim 1 as" should be -- claim 1 comprising having said particle K as --

Signed and Sealed this

Fifteenth Day of March, 2005

JON W. DUDAS
*Director of the United States Patent and Trademark Office*